Figure 1:
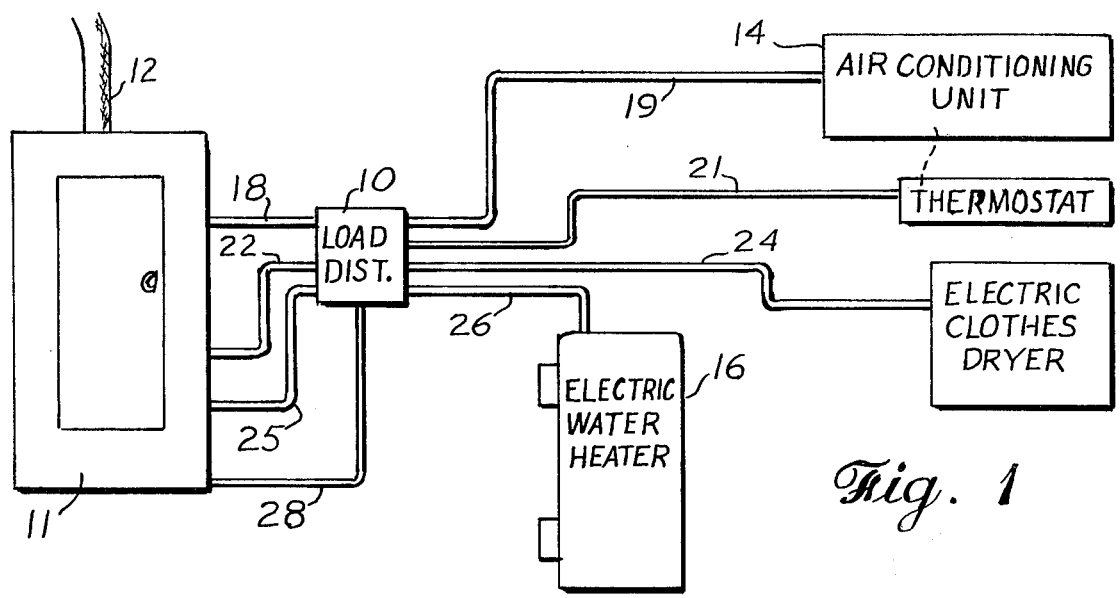

United States Patent [19]
Manning et al.

[11] 4,066,913
[45] Jan. 3, 1978

[54] ELECTRIC LOAD DISTRIBUTOR

[76] Inventors: Michael L. Manning, 155 Lakeforest Drive; Thurman L. Anglin, 31 N. Stratford Drive, both of Athens, Ga. 30601; Richard F. Grayson, Union Church Road, Watkinsville, Ga. 30677

[21] Appl. No.: 706,773

[22] Filed: July 19, 1976

Related U.S. Application Data

[63] Continuation-in-part of Ser. No. 611,526, Oct. 7, 1975, abandoned.

[51] Int. Cl.² .............................................. H02J 3/00
[52] U.S. Cl. .................................................... 307/38
[58] Field of Search ...................... 307/38, 39, 41, 31, 307/35

[56] References Cited

U.S. PATENT DOCUMENTS

| 3,629,599 | 12/1971 | Zuckerman | 307/38 |
| 3,970,861 | 7/1976 | McCollum | 307/35 |

*Primary Examiner*—Herman J. Hohauser
*Attorney, Agent, or Firm*—James B. Middleton

[57] ABSTRACT

A load distributor for an electric power system having a plurality of loads, each of the loads having a priority level, the load distributor including a first disabling means operable by a first load having a first priority level for disabling at least one other load having a lower priority level. The load distributor may further include second disabling means operable by a second load having a second priority level for disabling another load having a lower priority level, the second load and other load being some of the aforementioned plurality of loads. A thermostat or other variable device may be included in one or more of the loads for selectively varying the priority level of the load.

10 Claims, 2 Drawing Figures

ELECTRIC LOAD DISTRIBUTOR

CROSS-REFERENCE TO RELATED APPLICATION

This application is a continuation-in-part of the co-pending application filed Oct. 7, 1975, under Ser. No. 611,526 by the same inventors, and entitled "Electrical Peak Load," now abandoned.

This invention relates generally to power distribution systems, and is more particularly concerned with power distributing means for an electric power user for minimizing the peak power demand.

For a considerable number of years, there has been a trend towards greater use of electrical power in residences. A significant portion of the electrical power used in present-day residences is used for major appliances and devices such as electric heating and cooling, electric water heaters and electric clothes dryers. Though a reasonably large amount of electric power is used in a normal residence for such things as lighting, radio, television and various sound systems, the total amount of power required for all these smaller items tends to be equal to the power required for only one or two of the major items. Thus, use of electrical power to operate a few major appliances or devices creates an extremely large demand for power when two or more are operated at the same time.

The presence of a large power demand by a residence leads to several large expenditures. First, it will be realized that the company supplying the electric power must have sufficient power available to meet the maximum expected demand; however, because of the nature of society, there tend to be periods of several hours in which there is relatively little demand, followed by relatively short periods in which there is exceptionally high demand. As a result, the power company's large capacity is virtually wasted for long periods of time and called into use for only short periods. In addition, it will be realized that if a residence is to have several major electrical appliances, the service drop bringing power to the house must be large enough to carry the maximum current required for all the appliances. Then, the main electrical panel must be similarly large with the attendent large expense. It will therefore be seen that there is an excessive capital expenditure on the part of both the power company and the residence owner in order to be able to supply a peak demand for electrical power.

In the past, there have been some efforts to resolve the problem of the peak demand for electrical power. One rather obvious solution is to penalize a user by increasing the charge for electric power in accordance with the power demand. While such a system produces revenue with which the power company can provide the power the system does nothing to prevent the excessive expenditure by both power company and user. Other systems have been devised wherein one monitors the total power used and selectively disconnects certain electrical loads when the demand reaches a predetermined level. When demand decreases, various systems have been utilized for re-connecting loads in accordance with priority of the loads. All of these prior art systems, however, have taken the form of very complex systems, generally including some form of electronic data processing means for storing information, monitoring power use, and making decisions based on the stored information. Such systems are necessarily expensive and tend to be usable only in large groups of dwellings such as in a multiple-dwelling building, or in a community or the like. Also, since there is a central control over a plurality of dwellings, there is little or no opportunity for a person to change the priorities of loads to be in accordance with his own values.

The present invention overcomes the above mentioned and other difficulties with the prior art by providing load distributing means adapted to distribute the electrical load of a single power user. The distributing means of the present invention includes means by which operation of a first load having first priority disables other loads having lower priority. When the load of first priority is not in operation, one of the other loads can be operated and disable other, even lower priority, loads. Additionally, at least one of the loads includes means for altering the level of priority so that the apparatus of the present invention is subject to personal values as to load priorities.

Though the present invention is designed primarily for use by a single user of electrical power, it will be understood that a device made in accordance with the present invention will lower the peak demand of the single user. As a result, if all users of a given power company utilized such apparatus, the peak demand on the power company's facilities would be lowered. Thus, a single user could benefit from use of the present invention through a lower capital expenditure in electrical service to a residence. If the user is on a "demand rate" for his power, he could benefit through lower rates paid for the power. Power companies could benefit significantly from use of the present invention by lowering the investment they must make in power generating plants in that the excessive capacity to meet the peak demands would no longer be necessary.

Figure 2:
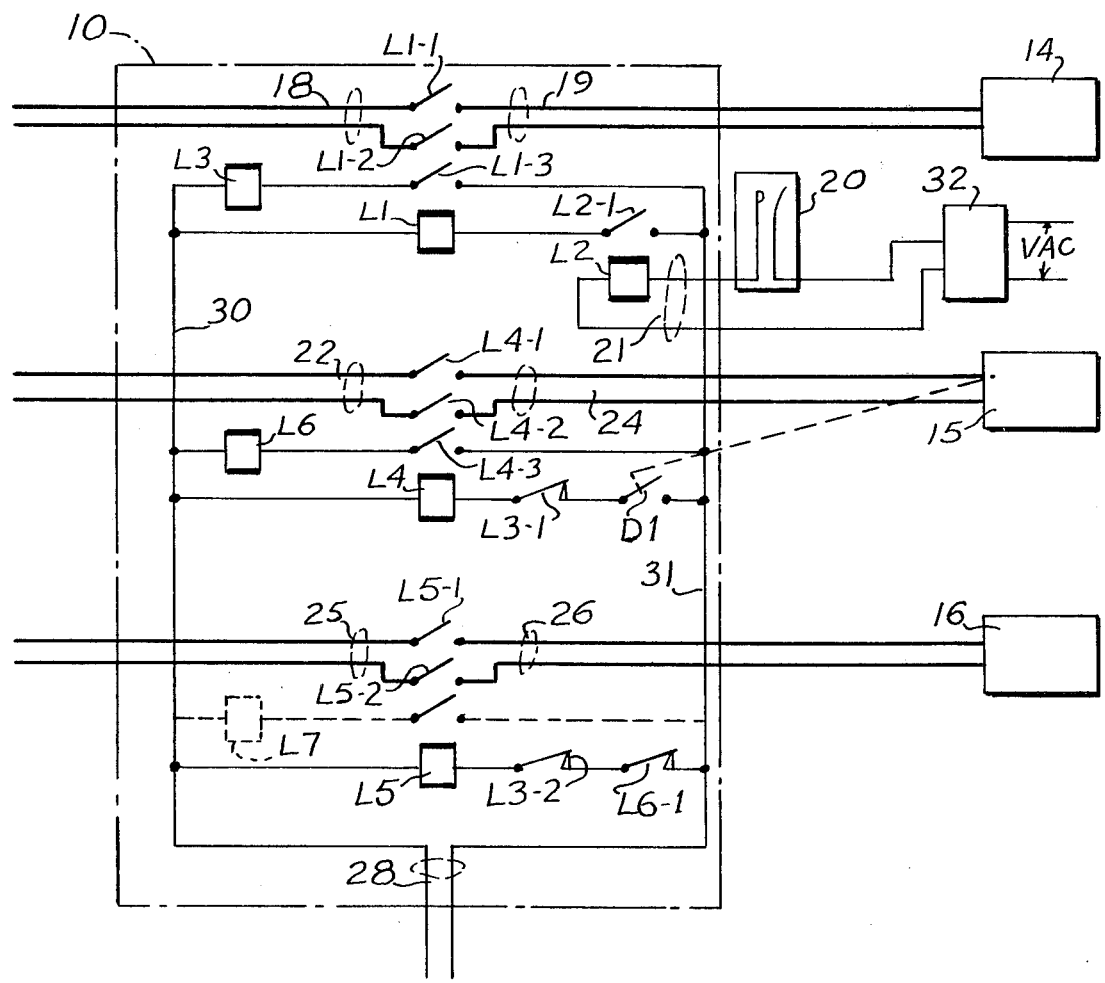

These and other features and advantages of the present invention will become apparent from consideration of the following specification when taken in conjunction with the accompanying drawings in which:

FIG. 1 is an illustration showing the installation of an electrical load distributor made in accordance with the present invention; and, FIG. 2 is a schematic diagram showing one embodiment of the electrical load distributor of the present invention.

Referring now more particularly to the drawings, and to that embodiment of the invention here chosen by way of illustration, it will be seen in FIG. 1 of the drawings that the load distributor 10 is connected by appropriate electrical cables to the main electrical panel 11, and the panel 11 is supplied with electrical power through the entrance cable 12.

It will be understood that the distributor 10 can be used to control almost any electrical load from very small appliances and lights to large heating and cooling systems, machinery and the like. By way of illustration, however, three very common major appliances are shown, each of the appliances requiring approximately 4 or 5 kilowatts for its operation. Thus, if all three appliances are used simultaneously, they will have a power demand of 12 to 15 KW, while if they are used one at a time, the demand drops to 4 to 5 KW. Further, for purposes of illustration, it is assumed that the highest priority of use is given to the air conditioning unit 14, with second priority given to the clothes dryer 15 and third priority given to the hot water heater 16. These priorities are given by way of example, but it will be understood by those skilled in the art that the appliances to be controlled and the priorities given to the appliances are variable in each installation and at least somewhat variable after installation.

The panel 11 as here shown is a conventional electrical panel, and includes a plurality of overload protection devices, one such device being installed on each of a plurality of separate circuits. Such a panel would therefore have a plurality of electrical cables extending therefrom for carrying electrical power to various parts of the building, at least one such cable being provided for each circuit. For clarity of illustration, however, most of the cables are omitted, and cables are shown for only the circuits to be described in detail in conjunction with the present invention.

There is a cable 18 extending from the panel 11 and leading to the distributor 10. As will be seen hereinafter, the cable 18 is connected internally of the distributor 10 to a cable 19 which leads to the air conditioning unit 14. Also, a thermostat 20 is here shown, the thermostat 20 having a line 21 that is connected into the distributor 10. As will be discussed in detail below, the distributor 10 is inserted into the circuit to the air conditioning unit 14 to control the circuit. Similarly, a cable 22 is connected through the distributor 10 to a cable 24 which provides power to the clothes dryer 10, and a cable 25 is connected through the distributor 10 to a cable 26 which provides power to the water heater 16. A line 28 is connected between the panel 11 and the distributor 10 for providing power to the electrical control means within the distributor 10.

Attention is now directed to FIG. 2 of the drawings for a detailed discussion of the load distributor 10. The load distributor 10 is indicated by the broken line in FIG. 2, and the various electrical cables 18–28 are shown schematically.

It will be remembered that the air conditioning unit has been assigned to the highest priority in this illustrative example, so the air conditioning unit can receive power any time conditions demand. To achieve this, it will be seen that there is a relay connecting the cable 18 from the panel 11 to the cable 19 supplying the air conditioner 14.

At this point it should be understood that the coil for operating a relay is assigned the letter L followed by a number, e.g., L1, L2, etc. Switches, or relay contacts, are then designated by the coil designation plus a hyphen and a number. Thus L1-1 designates a first switch operated by coil L1, L1-2 designates a second switch operated by coil L1, and so forth. Such designation is frequently used in the electrical arts and should be understood without further elaboration.

Returning to FIG. 2 of the drawings, it will be seen that there is a relay coil L1 having contacts L1-1 and L1-2 connecting the conductors of cable 18 to cable 19. The contacts are shown in their normal condition, so the contacts are normally open. It will therefore be seen that the relay L1 must be energized to close contacts L1-1 and L1-2 in order to operate the air conditioner 14.

The relay coil L1 is connected between two line wires 30 and 31 which comprise the cable 28. The wires 30 and 31 provide the power for operation of the components of the load distributor 10. Thus, the coil L1 is connected to the wire 30, and the other side of the coil L1 is connected to the wire 31 through a relay contact L2-1. The relay coil L2 controls the contact L2-1 so that the relay constitutes disabling means for the relay L1, hence for the air conditioner 14.

Because the air conditioner 14 has been assigned the highest priority, the disabling means operates only when it is determined that the air conditioner 14 does not need to operate. As is conventional, this decision is made by the thermostat 20. The arrangement with the distributor 10 is that the thermostat 20 acts as a control switch to connect the relay coil L2 to the secondary winding of the transformer 32. As is conventional, power would always be supplied to the primary winding so that any time the thermostat 20 closes, the coil L2 will be energized to close contact L2-1. Closing contact L2-1 will place coil L1 across the lines 30 and 31 to energize coil L1 which will in turn close contacts L1-1 and L1-2. As a result, the air conditioner 14 will be operated any time the ambient temperature causes the thermostat 20 to close its contacts.

The control for the air conditioner 14 as here shown is conventional for central air conditioning units. It should also be understood, however, that the other control arrangements could also be used, the important feature being means to operate the disabling means. In the case of other control arrangements, other means could be used to open a switch such as the contact L2-1 to achieve the same result.

Also, it will be noted that the relay L2 is used simply to energize the relay L1. In many practical installations such an arrangement will be necessary due to the power requirement of the relay L1 and the low power available from the transformer 32. Nevertheless, it should be understood that the use of the two relays is only an expedient to meet the exigencies of one common situation, and the omission of relay L2 is well within the scope of the present invention.

Since the air conditioner 14 is first priority, there must be some means for indicating that no other apparatus can use power while the air conditioner is using power. To provide such an indication, the relay L1 has a third contact L1-3 which connects the line 31 to a relay coil L3, the opposite side of L3 being connected to the line 30 so that, on closing of contact L1-3, coil L3 will be energized.

At this point it should be understood that each of the circuits being controlled by the distributor 10 is broken by a set of relay contacts, so that a relay coil must be energized in order to close the circuit and operate any particular appliance. Thus, it will be seen that the cable 22 is connected through a relay L4 to the cable 24, and the cable 25 is connected through a relay L5 to the cable 26.

The coil L4 is connected between the line wires 30 and 31; but, between the coil L4 and the wire 31, there is a pair of switches. One of the switches is designated L3-1, and is a normally closed contact of relay L3. Similarly, the coil L5 is connected between the line wires 30 and 31; but there is a pair of switches between the coil L5 and the line 31. One of these latter switches is designated L3-2, and is another normally closed contact of the relay L3. Since the contacts L3-1 and L3-2 must be closed, or in their normal condition, in order to energize the coils L4 and L5 respectively, it will be seen that energizing the coil L1 thereby closing contact L1-3 prevents operation of either relay L4 or relay L5. It will therefore be seen that disabling means are provided wherein operation of the air conditioner 14 prevents operation of either the dryer or the water heater 16. The only apparatus to stop operation of the air conditioner is the thermostat 20 which controls the relay L2, so the air conditioner 14 will operate in accordance with the ambient temperature.

When the air conditioner 14 is not operating, either of the other two appliances may be used. The dryer 15 is arranged to receive power through relay contacts L4-1 and L4-2 which must be closed by coil L4. To energize coil L4, the contact L3-1 must be closed, which means that relay L1 must be de-energized, and the switch D1 must be closed, the switch D1 being operated by the dryer 15.

Though no particular mechanical operation is here shown for operation of switch D1, it will be understood by those skilled in the art that the switch D1 may be physically located on the dryer 15, or the switch D1 may be a relay contact wherein the relay is energized by means at the dryer 15. Many forms of physical arrangement will suggest themselves to those skilled in the art.

Once the switch D1 is closed by appropriate manipulation at the dryer 15, assuming the contact L3-1 is closed, the coil L4 will be energized closing contacts L4-1 and L4-2 to operate the dryer 15, and contact L4-3 will be closed. The closing of contact L4-3 will place the control voltage across relay coil L6 because one side of L6 is connected to the wire 30, and the other side is connected through contact L4-3 to the wire 31. Energizing coil L6 will operate contact L6-1 which is adjacent to and in series with contact L3-2 and coil L5. Relay L6 therefore serves as the disabling means for relay L5 when the relay L4 is closed and the dryer 15 is operating.

Looking finally at the water heater 16, it will be seen that the circuit to the water heater 16 is broken through relay contacts L5-1 and L5-2, so the coil L5 must be energized to allow operation of the water heater 16. Before the coil L5 can be energized, however, the contact L3-2 must be closed which means relay L1 must be de-energized, and contact L6-1 must be closed which means relay L4 must be de-energized. Thus, the water heater 16 can be disabled by either of the other two appliances.

There is a third contact, L5-2, connected by wires shown in dashed lines to a relay L7 shown in dashed lines. Though the present illustrative embodiment of the invention includes controls for only three appliances, it should be understood that addition of the relay coil L7 as shown in dashed lines would allow the addition of control circuits similar to those here shown. Energizing relay coil L7 would open appropriate disabling contacts in the circuits of less priority in the same manner as discussed above.

From the foregoing it will be understood that the distributor 10 will be connected into the circuits of each of the appliances or devices to be controlled. Since the air conditioner 14 is here shown as having the highest priority, the relay L1 will be energized any time the thermostat 20 detects a high temperature and closes the switch in the thermostat. Because of this, it will be readily seen that, if a person decide to have less cooling and more clothes drying and/or water heating, the setting on the thermostat can be changed so the demand will be less.

The dryer 15 is operated only when one takes steps to make it operate, such as by closing the switch D1 in whatever manner is chosen. Once the dryer 15 is set to operate, it will have second priority so that the water heater is disabled, but the air conditioner 14 can operate and simultaneously disable the dryer. However, when the air conditioner 14 ceases operation, the switch D1 will remain closed, so closing the contact L3-1 will automatically re-start the dryer 15.

The circuit to the water heater 16 is such that, any time one of the other two appliances is not operating, the circuit to the heater 16 is completed. Since the heater 16 contains its own thermostats, power is provided purely on a priority basis, and the self-contained thermostats control the operation within the allotted time.

It will of course be understood by those skilled in the art that the particular embodiment of the invention here shown is by way of illustration only, and is meant to be in no way restrictive; therefore, numerous changes and modifications may be made, and the full use of equivalents resorted to without departing from the spirit or scope of the invention as defined by the appended claims.

We claim:

1. In an electric distribution system including a panel having a plurality of circuits, a power supply to said panel, and a plurality of loads connected to said plurality of circuits, a first load of said plurality of loads being the only load on a first circuit of said plurality of circuits, and a second load of said plurality of loads being the only load on a second circuit of said plurality of circuits, the improvements comprising a load distributor connected into said first circuit and said second circuit, said load distributor including a first circuit interrupting means for interrupting said first circuit between sad panel and said load, and a second circuit interrupting means for interrupting said second circuit between said panel and said second load, and disabling means for causing said second circuit interrupting means to interrupt said second circuit while said first circuit is completed to said first load, said disabling means including detecting means for determining when said first circuit is completed to said first load, and switch means responsive to said detecting means for interrupting said second circuit.

2. In an electric distribution system as claimed in claim 1, a third load of said plurality of loads being the only load on a third circuit of said plurality of circuits, said improvement further including a third circuit interrupting means for interrupting said third circuit, said disabling means including second switch means responsive to said detecting means to cause said third circuit interrupting means to interrupt said third circuit while said first circuit is completed to said first load.

3. In an electric distribution system as claimed in claim 2, said improvement further including second disabling means, said second disabling means including second detecting means for determining when said second circuit is completed to said second load, and third switch means for causing said third circuit interrupting means to interrupt said third circuit while said second circuit is completed to said second load.

4. In an electric distribution system as claimed in claim 3, said first circuit interrupting means, said second circuit interrupting means, and said third circuit interrupting means comprising first, second and third relay means respectively, having associated switch means, said disabling means comprising fourth relay means having said switch means, said fourth relay means being operable by one of said associated switch means of said first relay means.

5. In an electric distribution system as claimed in claim 4, said second relay means and said third relay means being connected in series with said associated switch means of said fourth relay means.

6. In an electric distribution system as claimed in claim 4, said second disabling means comprising a fifth relay means having associated switch means, said fifth relay means being operable by said associated switch means of said second relay means.

7. In an electric distribution system as claimed in claim 6, said associated switch means of said fifth relay means being connected in series with said third relay means.

8. In an electric distribution system as claimed in claim 7, said second load and said third load each including switch means for selectively connecting said load into its circuit, said switch means for selectively connecting said load being between said load distributor and said load.

9. In an electric distribution system as claimed in claim 7, said first load including means for causing intermittent operation of said first load, said means for causing intermittent operation of said first load being operably connected to said first circuit interrupting means for operating said first circuit interrupting means to interrupt said first circuit, 10. In an electric distribution system as claimed in claim 9, said means for causing intermittent operation of said first load comprising a variable thermostat responsive to ambient temperature, relay means operable by said thermostat, said relay means being operably connected to said first circuit interrupting means.

* * * * *